US008731896B2

(12) United States Patent
Duffie et al.

(10) Patent No.: US 8,731,896 B2
(45) Date of Patent: May 20, 2014

(54) VIRTUAL TESTBED FOR SYSTEM VERIFICATION TEST

(75) Inventors: Paul Kingston Duffie, Palo Alto, CA (US); Pawan Kumar Singh, Sunnyvale, CA (US); Adam James Bovill, San Francisco, CA (US); Rory Stephen Latchem, Wellington (NZ)

(73) Assignee: Spirent Communications, Inc., Sunnyvale, CA (US)

( * ) Notice: Subject to any disclaimer, the term of this patent is extended or adjusted under 35 U.S.C. 154(b) by 920 days.

(21) Appl. No.: 12/497,321

(22) Filed: Jul. 2, 2009

(65) Prior Publication Data

US 2011/0004460 A1    Jan. 6, 2011

(51) Int. Cl.
*G06F 9/455* (2006.01)

(52) U.S. Cl.
USPC .............................. 703/23; 703/24; 702/182

(58) Field of Classification Search
USPC ....................................... 703/23, 24; 702/182
See application file for complete search history.

(56) References Cited

U.S. PATENT DOCUMENTS

| | | | |
|---|---|---|---|
| 6,832,184 B1 * | 12/2004 | Bleier et al. ..................... | 703/23 |
| 7,475,288 B2 * | 1/2009 | Multhaup et al. ................ | 714/28 |
| 7,484,226 B2 * | 1/2009 | Brooks et al. ................... | 719/330 |
| 7,698,122 B2 * | 4/2010 | Chrysanthakopoulos ...... | 703/24 |
| 2005/0015702 A1 * | 1/2005 | Shier et al. ..................... | 714/776 |
| 2006/0206906 A1 * | 9/2006 | Brooks et al. ................... | 719/330 |
| 2009/0119542 A1 * | 5/2009 | Nagashima et al. ............ | 714/33 |

OTHER PUBLICATIONS

Alexander Volynkin, Victor Skormin, "Large-scale Reconfigurable Virtual Testbed for Information Security Experiments" IEEE, ISBN: 978-1-4244-0738-5; May 2007, 9 pages.*
PCT International Search Report and Written Opinion, PCT Application No. PCT/US10/37651, Aug. 9, 2010, 8 pages.

* cited by examiner

*Primary Examiner* — Dwin M Craig
(74) *Attorney, Agent, or Firm* — Haynes Beffel & Wolfeld LLP; Ernest J. Beffel, Jr.

(57) ABSTRACT

A virtual testbed for system verification test is provided in which emulated responses are associated with certain steps of a system verification test. The emulated responses can be manually entered or populated with previous test results obtained from execution of the emulation-enabled steps on a real testbed. When the emulation-enabled steps are executed, the system verification test uses the emulated responses as the responses corresponding to the actions of the emulation-enabled steps as if the steps were executed on the real testbed, without actually executing the emulation-enabled steps on the real testbed. Therefore, the virtual testbed of the present invention allows development of test scripts for system verification test without constant, actual access to the real testbed.

27 Claims, 12 Drawing Sheets

VIRTUAL TESTBED FOR SYSTEM VERIFICATION TEST

BACKGROUND OF THE INVENTION

1. Field of the Invention

The present invention relates to system verification test (SVT) and, more specifically, to a virtual testbed containing emulated test results for use with test sequences of SVT on a System Under Test (SUT).

2. Description of the Related Art

Most systems, whether it is a hardware system or a software system, requires quality assurance (QA) and system verification tests (SVT) before it is released for actual use by the public. It is preferable to automate SVT, so that the SVT process can be carried out efficiently and accurately.

Software test automation in many cases requires that a testing program operate like a human interacting with a command-line interface (CLI) via protocols such as telnet, SSH (Secure Shell), or via a serial port. FIG. 1 illustrates a conventional SVT system interacting with the SUT (testbed). The testing system 100 (such as a test program) sends requests 140 containing commands to a testbed 120 such as the SUT to perform a configuration step in the test or to extract information from the SUT 120. In response to the requests 140, the testbed 120 sends responses 160 to testing system 100. The responses 160 are typically text, formatted in a way intended for human operators to digest.

Test of systems involves communication with many devices using a variety of different protocols (such as telnet, SSH, SNMP, web, etc.). When developing automated tests, it is necessary to have access to the actual equipment (SUT 120) so that the tests can be exercised on the actual equipment and therefore developed incrementally as the automated tests are developed. However, such test equipment is often very expensive or is of limited availability both in number and time, because such test equipment is often expensive prototypes. Also, a test developer may want to work offline outside of a firewall without connection the SUT 120. Moreover, it is often necessary to begin test automation and development of the test program before the hardware or software SUT 120 is even available for use in test development. Finally, another challenge is that automated tests are, themselves, difficult to verify, especially in the case of negative testing, when it is necessary to ensure that the automated test will correctly detect certain faults that are difficult to cause in the real equipment. It is difficult and costly to provide these fault conditions with an actual SUT 120.

Most automated tests today are scripts. These scripts use various libraries for communicating with the devices of the SUT 120. When developing the automated tests, one can try to remove code that would be communicating with real devices when there is no access to those actual devices. Also, one could add code in the test script itself to inject artificial faults. But such manipulation of code of the test script is difficult and time-consuming and in many cases will not properly exercise the test code.

SUMMARY

According to various embodiments, a virtual testbed for system verification test is provided in which emulated responses are associated with selected steps of a system verification test. The emulated responses can be manually entered or populated with previous test results obtained from execution of those selected steps on a real testbed. When the emulation-enabled, selected steps are executed, the system verification test uses the emulated responses as the responses corresponding to the actions of the selected steps as if the steps were executed on the real testbed, without actually executing the selected steps on the real testbed. Therefore, the virtual testbed of the present invention allows development of test scripts for system verification test without constant, actual access to the real testbed.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

In general, the present invention provides software for providing a virtual testbed including emulated responses corresponding to certain test sequences for SVT, so that the test sequences may be developed even without the SUT being available. The term "virtual testbed" herein is used to refer to a collection of emulated responses corresponding to test sequences for SVT.

Figure 1:
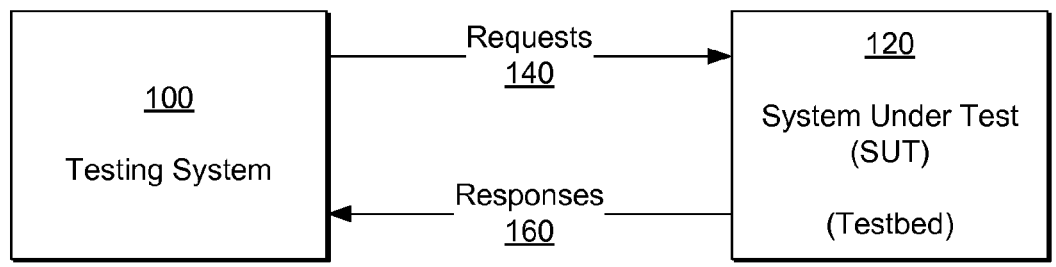
FIG. 1 illustrates a conventional System Verification Test (SVT) system interacting with the System Under Test (SUT).
Figure 2:
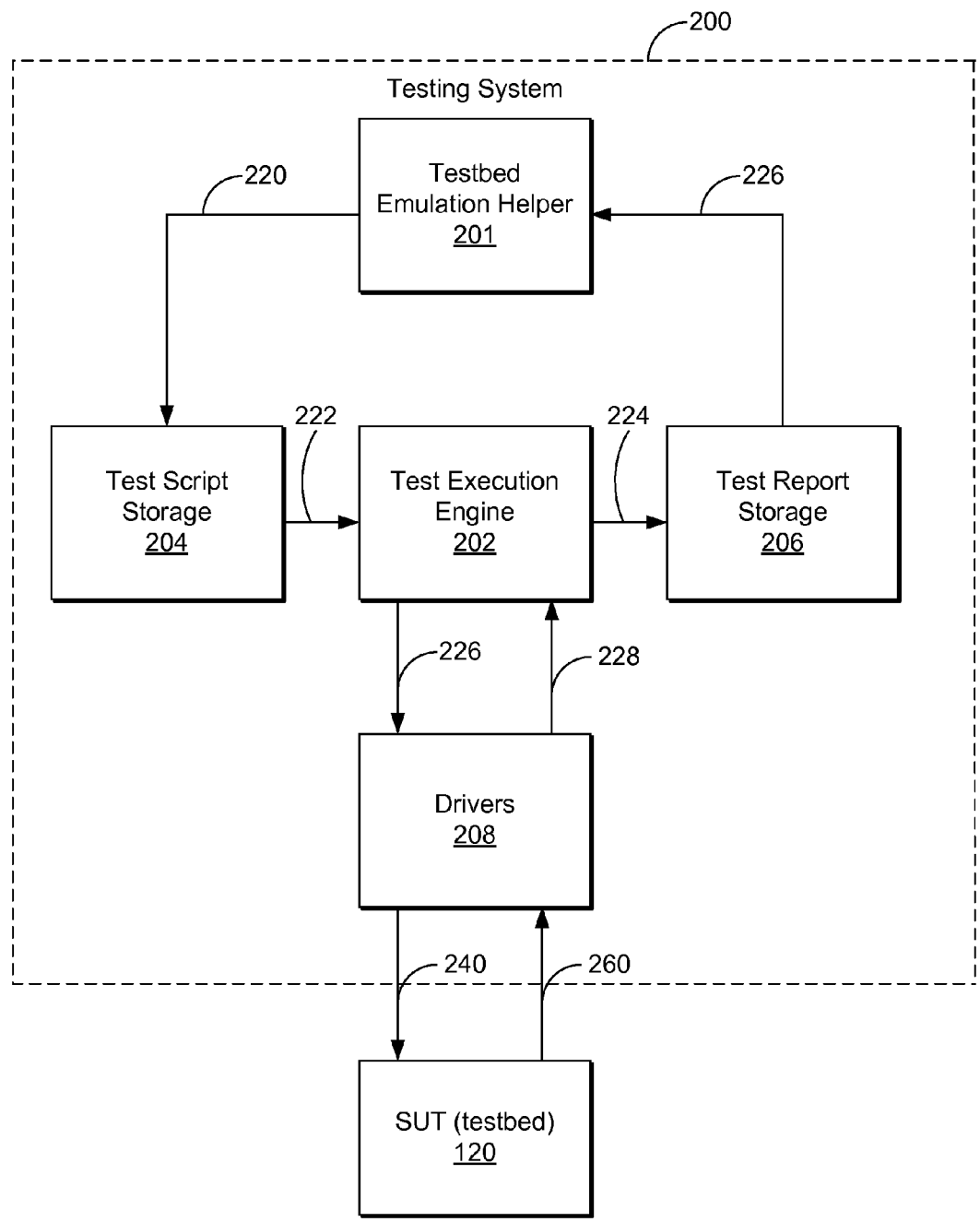
FIG. 2 illustrates the architecture of a SVT system, according to one embodiment.

Turning to the figures, FIG. 2 illustrates the architecture of a SVT system, according to one embodiment. The SVT system includes a testing system 200 and the SUT 120. Testing system 200 verifies the functionalities of, and assures the quality of, the SUT 120. The SUT 120 may be any type of hardware device, such as a computer, a networking device, a router, etc., or can also be computer software running on a computer, and may also include a plurality of such hardware or software devices. Testing system 200 sends various requests 240 to the SUT 120 to test the functionalities of SUT 120. Such requests 240 may be a set of commands designed to test the functionalities of interest of SUT 120. In response, SUT 120 sends responses 260 corresponding to the commands back to the testing system 200. In one embodiment, the responses 260 are in textual format so that a human operator of testing system 200 may understand conveniently.

Testing system 200 includes a variety of software modules including test script storage 204, test execution engine 202, test report storage 206, testbed emulation helper 201, and various device drivers 208. Test script storage 204 stores a variety of test programs for system verification test of the SUT 120, and provides the test sequences 222, typically in script form, to test execution engine 202. For example, XML (eXtensible Markup Language) may be used to describe each of the steps in a test program. A step may be part of a session, which describes the protocol to use for communication with the SUT 120 and other connection characteristics that may be required. Each step describes the action to take during such session and other information appropriate to that action. For example, if the device (not shown) in the SUT 120 is controlled through a command-line interface via telnet, then the action may be to "send a command" and additional properties to describe what command to send and how to determine when the response is complete.

Test execution engine 202 is execution software for executing the scripts of the test sequences 222, and provides the requests 226 corresponding to the test sequences 222 to the drivers 208 in protocol-independent form for testing of one or more of the devices (not shown) included in SUT 120. Device drivers 208 receive the protocol-independent requests 226 and convert them to protocol-specific requests 240 intended for the selected devices of the SUT 120 based on the session to which the step belongs. Each action of the steps produces a response 260 from the selected device in the SUT 120. Drivers 208 receive the protocol-specific responses 260 as received from the selected devices in the SUT 120, and converts them to protocol-independent responses 228 and provides them to test execution engine 202. The responses 228, regardless of session type, may carry the same structure of information: a human-readable textual response, a set of structured data (in the form of XML), a set of named XPATH queries suitable for analyzing that data, and a set of issues describing exceptional conditions encountered while executing the step. Test execution engine 202 stores the received responses 224 in test report storage 206, typically in human-readable form.

Note that the testing system according to the present invention also includes a testbed emulation helper 201. Testbed emulation helper 201 operates in conjunction with test script storage 204 and test report storage 206 to enable emulation of responses corresponding to some or all of the steps of the test program stored in test script storage 204. In other words, the testing system 200 adds step-level emulation capabilities to the automated SVT. Each step of the test script carries a new set of properties supporting emulated execution, describing (i) whether to emulate a given step during test execution or not, and (ii) providing emulation information be used when emulating that step. The emulation information is comprised of one or more emulated responses to be used (in addition to all components of a response described above).

As will be explained in more detail below with reference to FIG. 3, testbed emulation helper 201 may provide a user interface to allow a user (e.g., test developer) to manually enter the emulation information that will be used when emulating a step in some embodiments or have the emulation information automatically obtained from previous test reports 226 stored in test report storage 206. Testbed emulation helper 201 provides such emulation information 220 to test script storage 204 to indicate such emulation information in "emulation properties" field of the scripts of each of the emulated steps to be emulated, as stored in test script storage 204.

When test execution engine 202 executes such steps of the test program that are indicated as "emulated steps" in their emulation properties field, test execution engine 202 uses the emulated responses as the responses corresponding to those emulated steps. Test execution engine 202 does not actually communicate with the real devices in the SUT 120 at all when executing such emulated steps of the test program. Instead, test execution engine 202 internally generates the emulated response corresponding to the emulated steps as if the interaction with the devices in SUT 120 had taken place, using the emulation information associated with the emulated steps. Hence, the emulated steps of the test program can be viewed as executed on a "virtual testbed" rather than the actual devices in SUT 120, causing the emulated responses from the virtual testbed to be generated and received by test execution engine 202. Emulation can be enabled on individual steps, on multiple steps, or on all of the steps for one or more sessions in the test. If all steps in a session are emulated, then the actual device in SUT 120 will never be contacted during execution of the test program, enabling the possibility of executing a test where one or more of the devices are completely "virtual." Thus, the steps in the system verification test may be developed using the virtual testbed including emulated responses even without any interaction with the actual devices in SUT 120, thereby providing a variety of advantages in developing test programs for SVT as will be explained in more detail below with reference to FIGS. 5, 6, and 7.

Although the virtual testbeds provides a variety of advantages, they would not be useful unless accompanied by an efficient and convenient mechanism for populating the contents of the emulation information in the virtual testbeds. FIG. 3 illustrates a method of populating a virtual testbed for development of SVT sequences, according to one embodiment. Here, the term "populating" the virtual testbed refers to configuring the selected step of the SVT such that the selected step is associated with emulation information including an emulated response so that the emulated response is returned when an action corresponding to the selected step is executed, rather than returning a response from a real testbed. The virtual testbed becomes "populated" with such emulated responses, when a test developer configures the step of the SVT to use emulation and associates the step with emulation information (including an emulated response).

Figure 3:
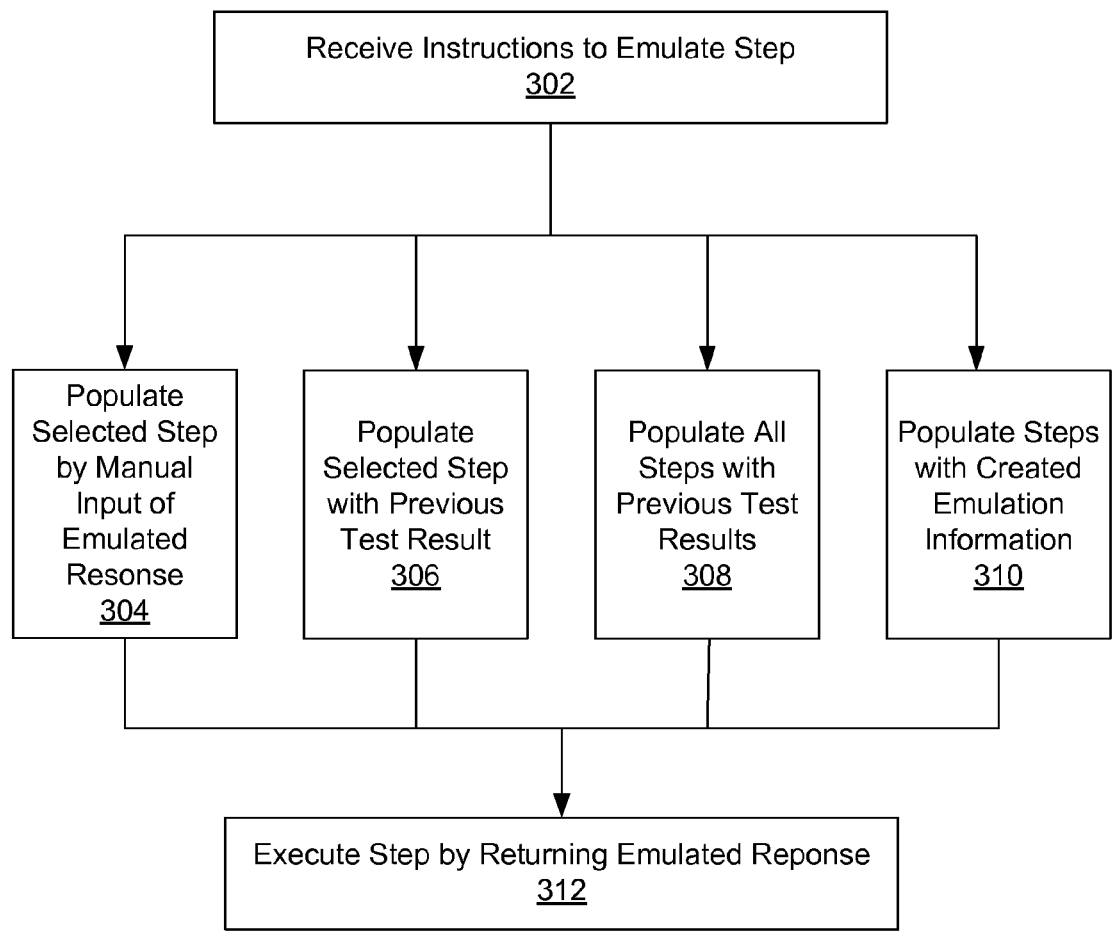
FIG. 3 illustrates a method of populating a virtual testbed for development of SVT sequences, according to one embodiment.

Referring to FIG. 3, in one embodiment, once instructions to emulate a certain step of the test program are received 302, the emulation information of the emulated step may be populated simply by manual input 304. However, it could be very time-consuming to manually populate the emulation properties for each step in a test, and thus manual input 304 is not an efficient way of populating the emulation information for the emulated step.

Thus, in other embodiments, testbed emulation helper 201 (FIG. 2) may take advantage of the fact that test system 200 includes test report storage 206 that stores previous test reports 224 corresponding to recent test executions on real devices in SUT 120. Testbed emulation helper 201 can use such previous test reports 226 from real devices and use the information in the previous test reports 226 to populate the emulation information corresponding to the steps to be emulated. In a simple example, the user could create an automated test, and run it against a real device such as a database. Then, the actual responses from the real device could be used to automatically populate the emulation information associated with all steps in the test using information from the previous test reports 226, as shown in step 308. In other embodiments, emulation information corresponding to certain selected steps of the test may be associated with emulation information obtained from the previous test reports 226, as shown in step 306.

In still other embodiments, it is also possible to artificially create a centralized database of emulated responses based on the nature of the devices in the SUT 120 involved, the session types, and the actions of the test sequence and other properties involved. Such artificially created emulated responses may be used to populate the emulation information corresponding to new steps or sessions to be added to an automated test, even before the test has been executed against real devices in SUT 120, as shown in step 310. This enables test developers to create automated system verification tests even before they have access to real testbeds.

Once the selected step is configured to use the emulated response, the selected step(s) of the SVT is executed in step 312 by returning the emulated response rather than receiving an actual response from the real testbed. The emulated step is not actually executed on the real testbed, but it is still possible to receive a response (i.e., the emulated response) to the action(s) of the selected step(s) as if they were executed on the real testbed.

As will be explained in more detail below with reference to FIGS. 5, 6, and 7, the availability of virtual testbeds allows test program developers to release access to the valuable real testbed resource and continue development of tests using emulated test responses when execution is needed and the real testbed is unavailable. For example, a test developer may continue to work on test development on a train or at home, running the test using emulated responses when needed, to verify changes to the test as they are made after the test developer leaves his office and loses access to the real testbed. For another example, the test developer may wish to enhance the test by adding more analysis based on information in the responses, and/or may want to add procedural logic and run the test to ensure that that new analysis and logic is working correctly, without having to use the real testbed. This is possible using the virtual testbed. Then, when the test developer regains access to a real testbed, emulation can turned off and the test can be run on a real testbed to verify its behavior against the real hardware or real software. In the meantime, valuable real testbed resources have been available for others to use. For still another example, the test developer can enable emulation for a specific step in a test and modify the emulated response so as to artificially inject a simulated fault. Then, the test developer can easily verify whether the rest of the automated test will correctly detect the injected fault and react appropriately, i.e., failing the test and cleaning up. These various advantages of using a virtual testbed will be more apparent from the examples explained below with reference to FIGS. 5, 6, and 7.

Figure 4:
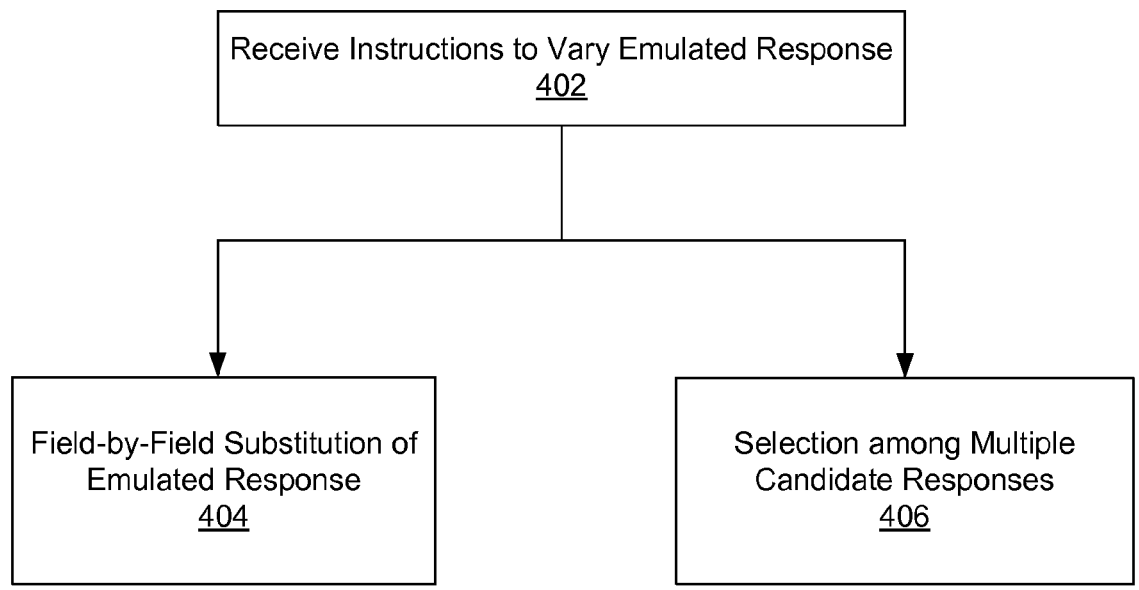
FIG. 4 illustrates a method of varying the emulated responses in a virtual testbed for development of SVT sequences, according to one embodiment.

FIG. 4 illustrates a method of varying the emulated responses of the virtual testbed for development of SVT sequences, according to one embodiment. In certain sophisticated tests, a given response to a request in a test may need to vary as the test progresses. Thus, if a given step of a test only produces a single canned emulated response, such canned emulated response may not provide an adequate level of emulation to allow test development to proceed. To address this situation, the emulated response information can contain a variety of mechanisms to allow the emulated responses to be controlled and varied for different instances of execution of the steps of the test, when the test is executed under emulation. For example, in response to instructions to vary the emulated responses (step 402), the emulated response may contain field-by-field "substitutions" (such as variables or parameters) which cause the emulated response to change accordingly at execution time, as indicated in step 404. These substitutions could produce sophisticated emulation effects, such as emulating an incrementing counter or a value that depends on other values, etc. Alternatively, the emulated response information may contain an emulated response that is selected among multiple candidate responses, as indicated in step 406.

Figure 5:
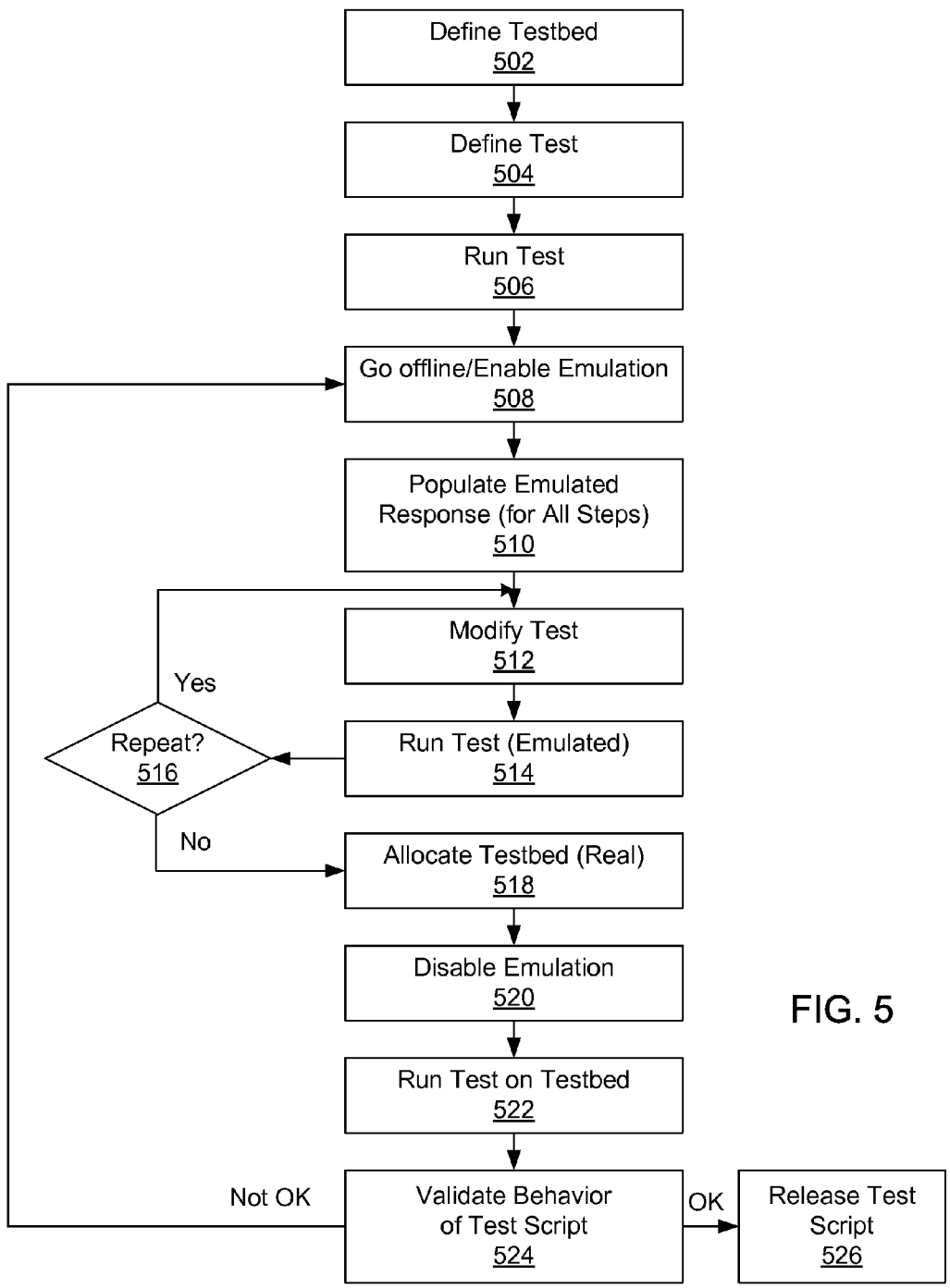
FIG. 5 illustrates a process flow of developing SVT sequences offline using the virtual testbed, according to one embodiment.

FIG. 5 illustrates a process flow of developing SVT sequences offline using the virtual testbed, according to one embodiment. First, a test developer defines 502 the SUT (testbed) to test and starts defining and developing 504 the test, and runs 506 the test on the real testbed. At some point in time, the test developer may want to release access to the real testbed). At such point, the test developer enables 508 emulation of the steps in the developed test and goes offline. As a result, emulated responses are used to populate 510 the virtual testbed as the responses associated with all steps in the developed test. Then, the test developer may continue to develop the test program with the emulated responses without access to the real testbed, modifying the test (step 512) as necessary and running the modified test on the virtual testbed with the emulated responses (step 514) until it is not necessary to repeat such modification process with the virtual testbed in step 516. When the test developer is ready to use the real testbed again in the test development process, the real testbed is re-allocated 518 to the test program, emulation is disabled 520, and the developed test is run on the real testbed 522. The behavior of the developed test script is validated 524 using the test responses from the real testbed and steps 508 through 524 are repeated if the behavior is not acceptable. Otherwise, the test script can be finally released 526 as the test program for the SUT (real testbed) 120. Thus, according to the process of FIG. 5, the test developer may continue to develop SVT scripts using emulated responses modeling the real testbed, even without access to the real testbed, reducing test development time and lowering the cost of test development.

Figure 6:
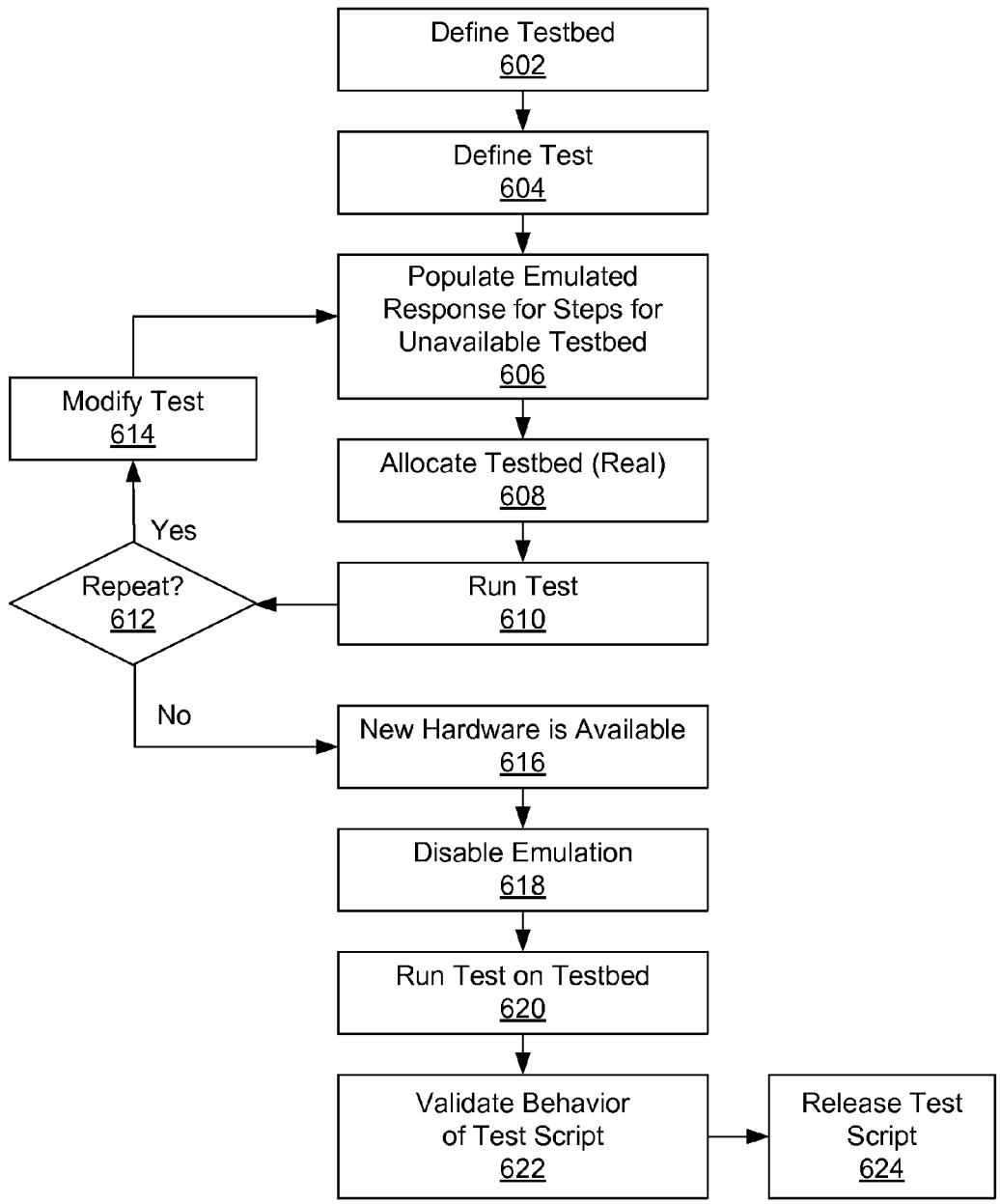
FIG. 6 illustrates a process flow of developing SVT sequences before some features of the SUT is developed and becomes available, according to one embodiment.

FIG. 6 illustrates a process flow of developing SVT sequences before some features of the SUT is developed and becomes available, according to one embodiment. Sometimes, a test developer may be tasked with developing a test program for testing a system before all the features of the system is fully developed and becomes available. The virtual testbed according to the present invention can be used effectively in these situations.

First, a test developer defines 602 the SUT (testbed) to test and starts defining and developing 604 the test. However, since certain features of the SUT 120 are not available to the test developer yet, the test program is populated 606 with emulated responses for those steps related to testing the unavailable features of the testbed. For the remaining steps of the test that are related to available features of the testbed, the real testbed is allocated 608 to the test program. Then, the developed test is run 610 with some of the steps executed on the real test bed 120 but other steps corresponding to unavailable features of the tested system being executed with the emulated responses. In step 612, if there is a need to repeat running the test with modifications, the test program is modified 614 and steps 606, 608, 610 are repeated.

At some point during the test program development process, the new hardware or software may become available 616, complete with all the features to test. At this point, emulation of the test steps is disabled 618, and all steps of the test are run 620 on the real testbed. The behavior of the developed test script is validated 622 using the test responses from the real testbed and the test script can be finally released 624 as the test program for the SUT (real testbed) 120. Thus, according to the process of FIG. 6, the test developer may develop SVT scripts using emulated responses modeling the real testbed that is not yet fully developed and available, thereby reducing test development time.

Figure 7:
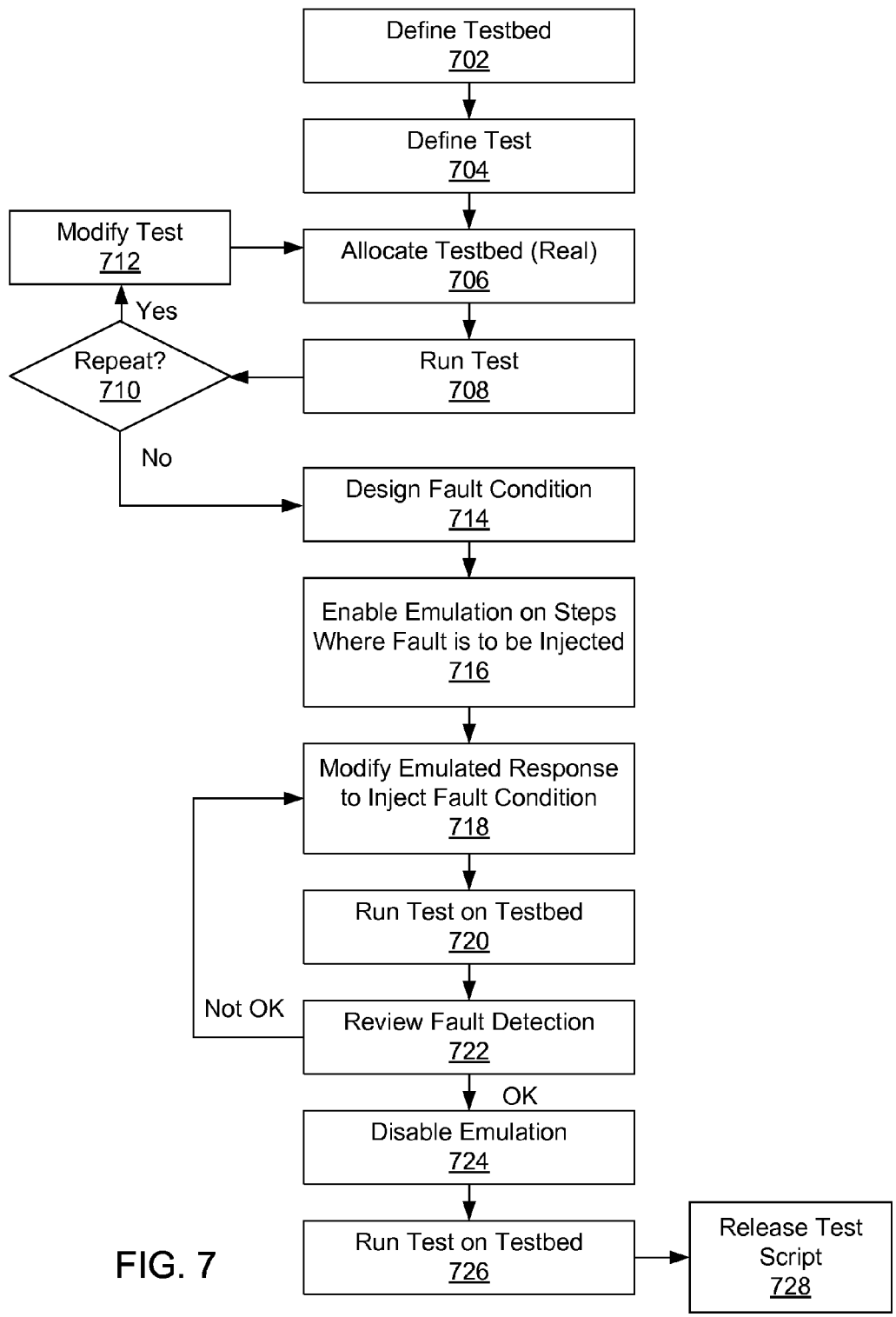
FIG. 7 illustrates a process flow of developing SVT test sequences with fault conditions injected using the virtual testbed, according to one embodiment.

FIG. 7 illustrates a process flow of developing SVT test sequences with fault conditions injected using the virtual testbed, according to one embodiment. Sometimes, a test developer may want to verify whether his own test program can correctly detect the fault conditions and react appropriately, i.e., failing the test and cleaning up. Thus, it would be useful to be able to test faulty responses of a testbed. However, it is generally difficult and costly to test fault conditions of a real testbed, as that would involve inducing fault conditions in an actual test device. The virtual testbed according to the present invention can be used effectively in these situations to inject fault conditions in the virtual testbed.

Referring to FIG. 7, a test developer defines 702 the SUT (testbed) to test and starts defining and developing 704 the test. Then, a real testbed is allocated 706 to the test program and the test is run 708 on the real testbed. In step 710, if there is a need to repeat running the test with modifications, the test program is modified 712 and steps 706, 708 are repeated.

At a certain point during the test development process, the test developer may want to test how the developed test program will react to faulty conditions in the testbed. To that end, a fault condition of the test device or system is designed 714 and "emulation" is enabled 716 on the steps of the test program where fault conditions are to be injected. Then, the emulation information corresponding to those emulated steps are modified to inject 718 the fault conditions, and the test is run 720 on the real testbed except that those fault-injected steps of the test program (as modified in step 718) are emulated with the injected fault conditions. The fault detection by the test program is reviewed in step 722, and steps 718, 720, 722 are repeated if the fault detection by the test program was not satisfactory. If fault detection by the test program was satisfactory, then emulation is disabled 724 and the test program is run 726 again entirely on the real testbed. Finally, the test script is released 728 when development and testing of the test script is complete.

Figure 8A:
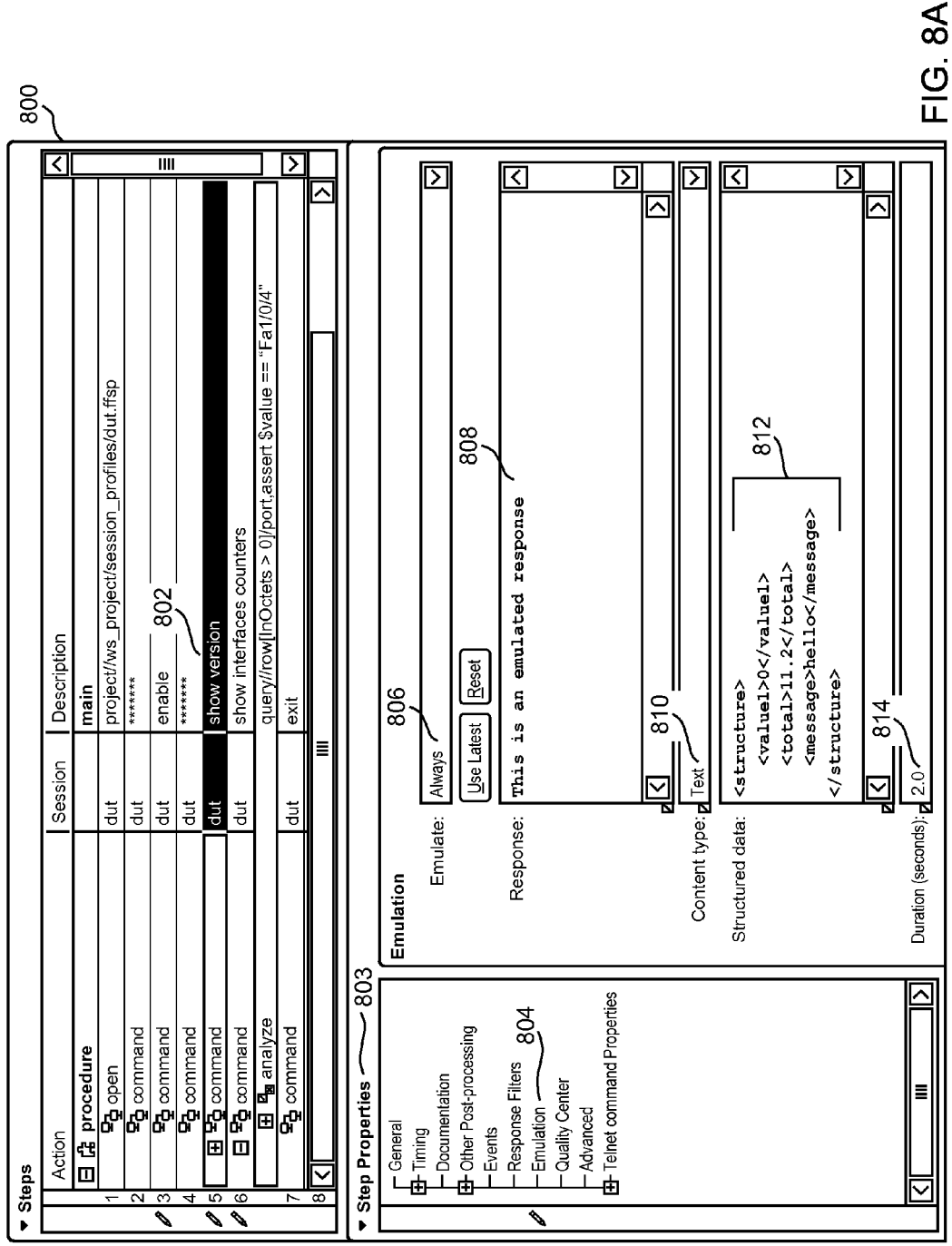
FIG. 8A illustrates an example screenshot of a test script editor for enabling emulation and manual entry of emulated test responses for use as the virtual testbed, according to one embodiment.

FIG. 8A illustrates an example screenshot of a test script editor for enabling emulation and manual entry of the emulation information to be associated with the emulated steps, according to one embodiment. Such test script editor may be provided by testbed emulation helper 200 (FIG. 2) as a user interface for viewing and editing the emulation properties associated with certain emulated steps of the test sequences for SVT, according to an embodiment of the present invention. As explained above, certain selected steps or all steps of a SVT 120 may be emulated according to the present invention.

In the test script editor screen 800 of FIG. 8A, step 802 includes one of the actions ("show version") to be executed on the SUT 120. The properties of each step of the SVT may be edited in the step properties window 803, and especially the emulation properties of each step of the SVT may be edited by selecting the emulation properties menu 804. When the emulation properties menu 804 is selected, various menus for selecting and editing the emulation properties of the selected step of the SVT are displayed. In the example of FIG. 8A, the emulation properties menu 804 is shown selected for SVT step 802 ("show version"), causing the various selection or editing menus 806, 808, 810, 812, or 814 to be displayed. In the example of FIG. 8A, step 802 is configured such that the response to step 802 is always an emulated responses from the virtual testbed, as indicated in selection 806 ("always"). The edited text 808 is manually input text that is to be used as part of the emulated response corresponding to step 802. Selection menu 810 indicates the content type ("text") of the emulated response. Structured data 812 indicates the structured response to be used as part of the emulated response corresponding to step 802, and is also manually entered. Duration menu 814 indicates the amount of time ("2.0 seconds") to be used as the emulated duration of execution for step 802, and is also manually entered.

Figure 8B:
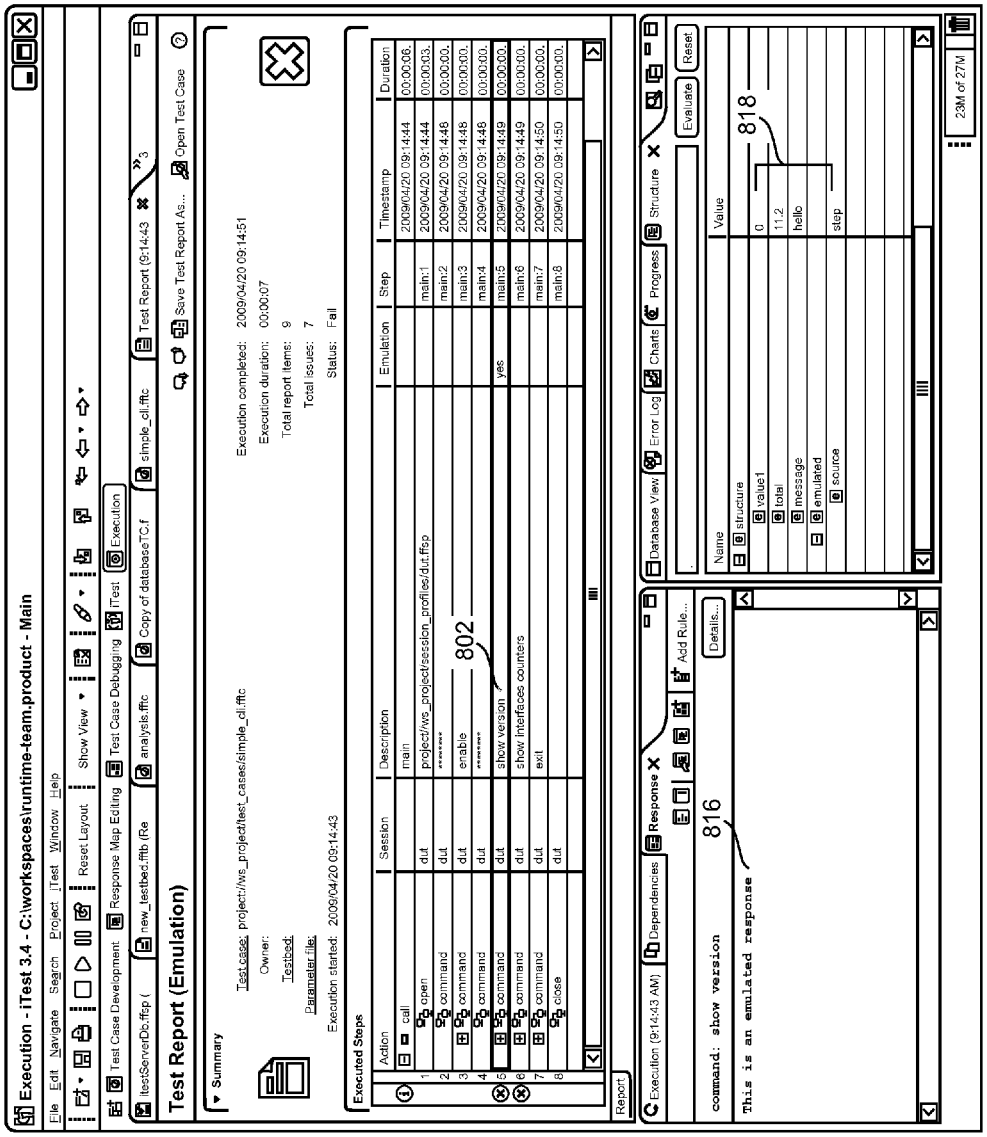
FIG. 8B illustrates an example screenshot of a test report generated when emulation of the test responses has been enabled as shown in FIG. 8A, according to one embodiment.

FIG. 8B illustrates an example screenshot of a test report generated when emulation of the test responses has been enabled as shown in FIG. 8A, according to one embodiment. The example of FIG. 8B shows the results of emulation of step 802 as configured in the user interface of FIG. 8A. Referring to FIG. 8B, the step 802 ("show version") is shown emulated as configured in the user interface of FIG. 8A, such that a test response 816 ("This is an emulated response") is used as the emulated response as configured in edited text response 808 in FIG. 8A. In addition, the structured response 818 is also received as part of the emulated response according to the configuration of the structured data 812 in FIG. 8A.

Figure 8C:
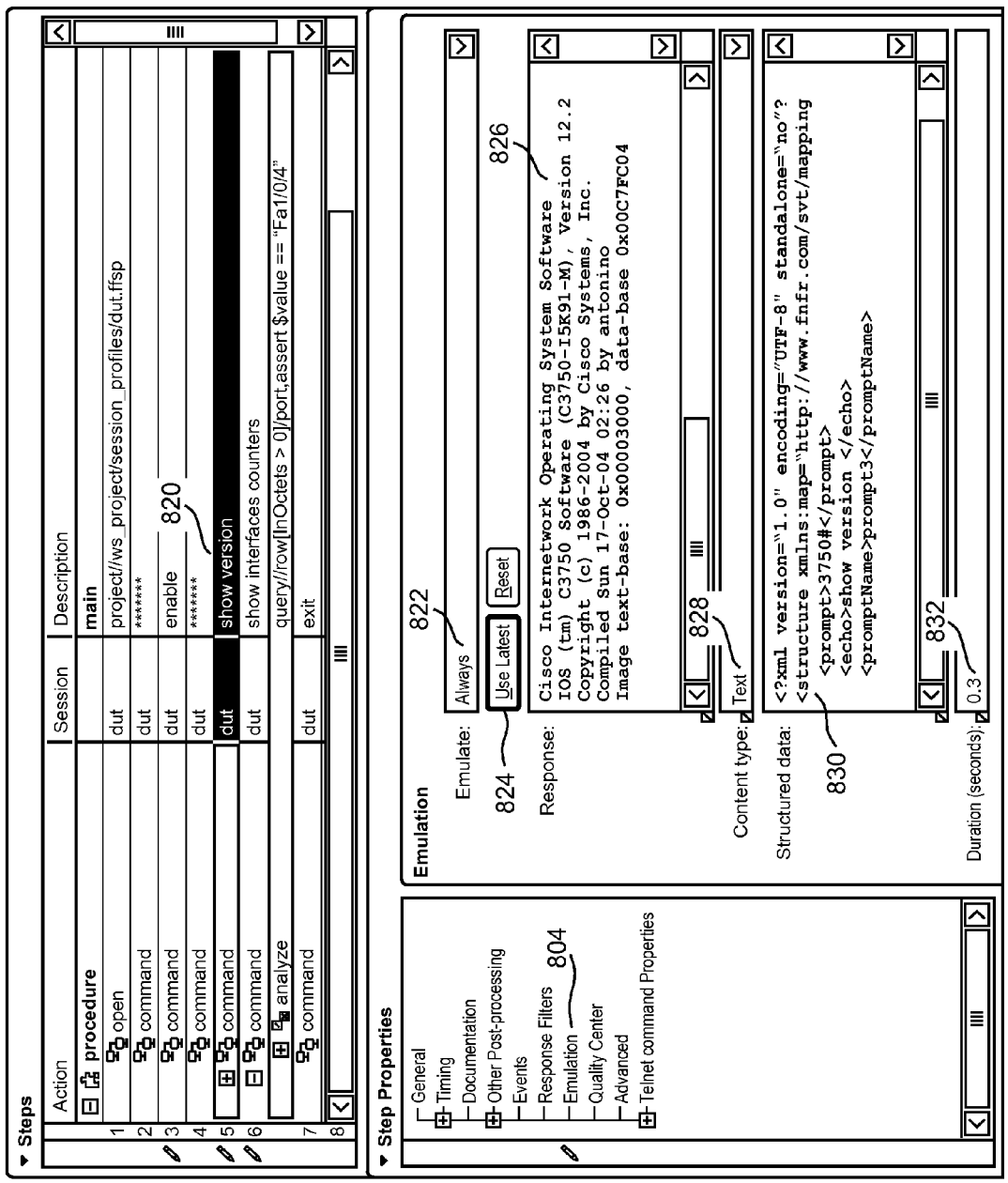
FIG. 8C illustrates an example screenshot of a test script editor for enabling emulation and automatic entry of test responses from previous test reports for use as the virtual testbed, according to one embodiment.

FIG. 8C illustrates an example screenshot of a test script editor for enabling emulation and automatic entry of test responses from previous test reports for use as the virtual testbed, according to another embodiment. The emulation properties 804 corresponding to step 820 ("show version") in FIG. 8C is configured differently from the example shown in FIG. 8A. Specifically, selection 824 is made to use the latest response corresponding to step 820 in the previous test results on a real testbed as the emulated response for step 820, when step 820 is configured to be always emulated as indicated in selection 822. Thus, the text response 826 obtained from the latest test result in an actual test run on a real testbed (device) is used as the emulated textual response corresponding to emulated step 820. In addition, the content type 828 ("text"), the structured data 830, and the duration of execution 832 (0.3 seconds) information are also obtained from the latest test result corresponding to the same actual test sequence (step) run on a real testbed (device), and is used as part of the emulated response corresponding to emulated step 820. Thus, when step 820 is executed, an emulated response corresponding to the emulated information 826, 830, 832 will be obtained.

Figure 9A:
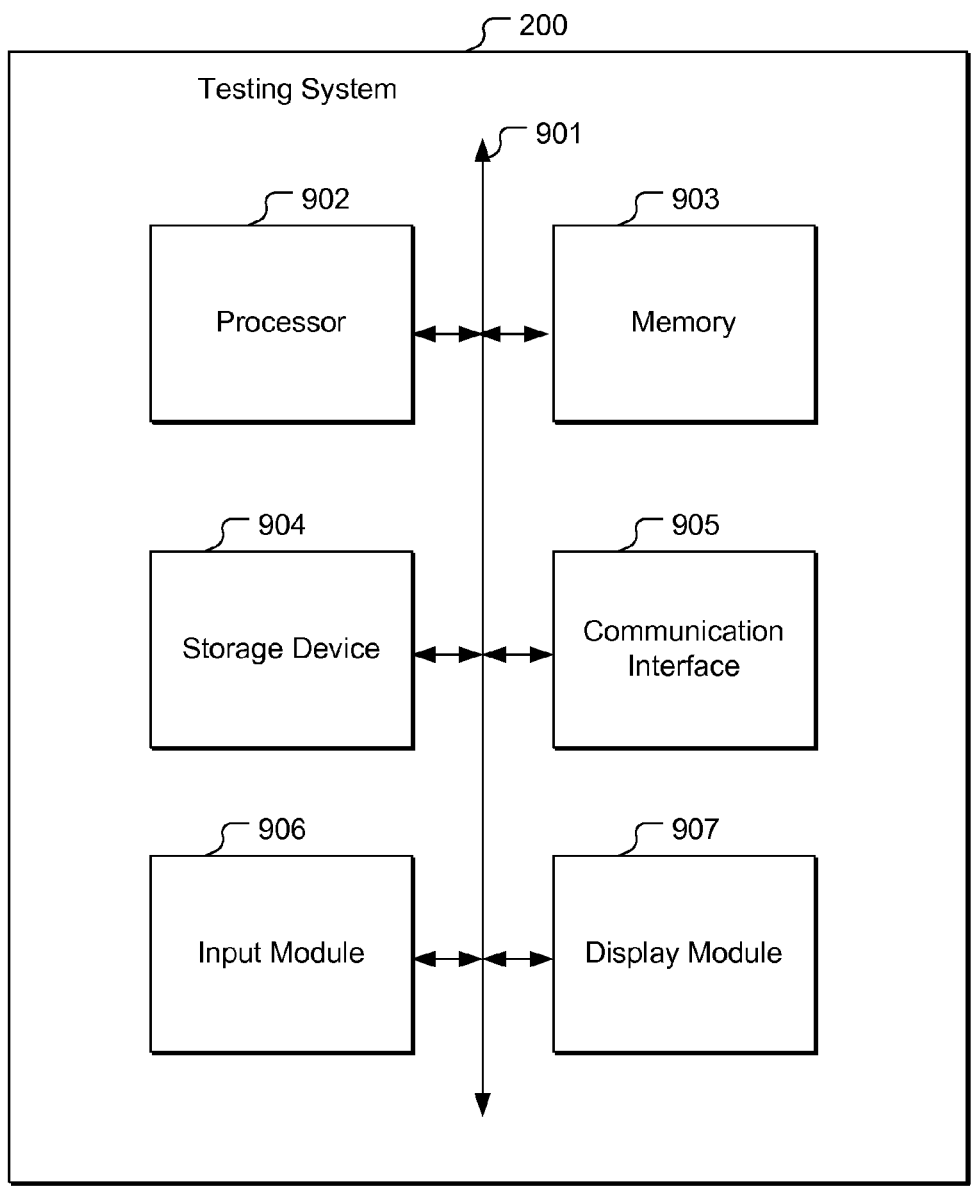
FIG. 9A illustrates the hardware architecture of a SVT system, according to one embodiment.

FIG. 9A illustrates the hardware architecture of a SVT testing system, according to one embodiment. In one embodiment, the testing system 200 is a server computer including components such as a processor 902, a memory 903, a storage device 904, an input module (e.g., keyboard, mouse, and the like) 906, a display module 907, and a communication interface 905, exchanging data and control signals with one another through a bus 901. The storage device 904 is implemented as one or more computer readable storage medium (e.g., hard disk drive), and stores software that is run by the processor 902 in conjunction with the memory 903 to implement the population and use of the virtual test bed according to the various embodiments of the present invention as illustrated herein. Operating system software and other application software may also be stored in the storage device 904 to run on the processor 902. Note that not all components of the testing system 200 are shown in FIG. 9A and that certain components not necessary for illustration of the present invention are omitted herein.

Figure 9B:
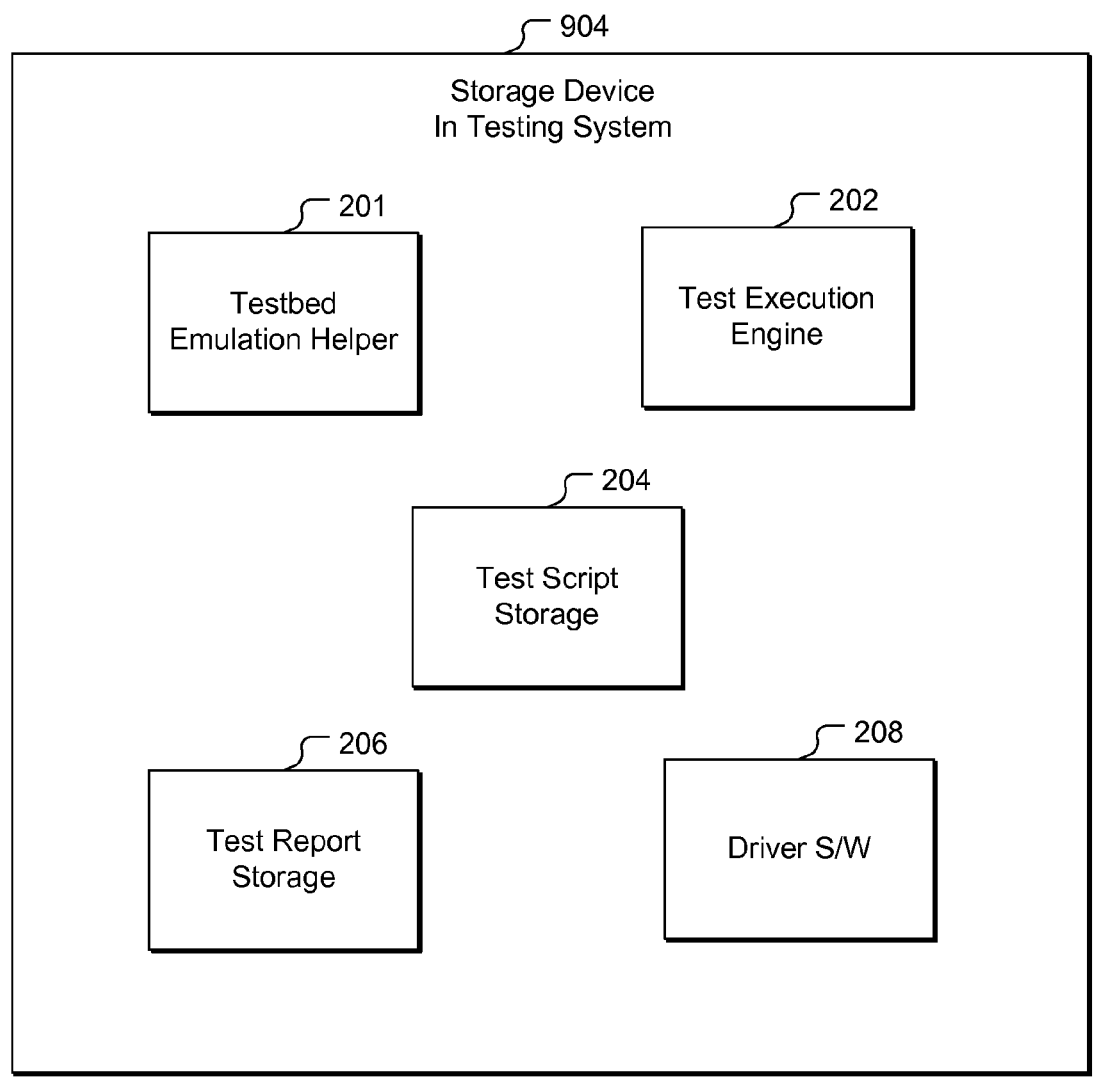
FIG. 9B illustrates the software modules for providing and using the virtual testbed for use in developing the test sequences of SVT, according to one embodiment.

FIG. 9B illustrates the software modules for providing and using the virtual testbed for use in developing the test sequences of SVT, according to one embodiment. The software modules include testbed emulation helper 201, test execution engine 202, test script storage 204, test report storage 206, and driver software 208, all illustrated above with reference to FIG. 2. These software modules (e.g., testbed emulation helper 201, test execution engine 202, etc.) are implemented as computer instructions stored in storage device 904 and are configured to cause processor 902 to operate in accordance with the various embodiments of the present invention as explained herein with respect to each of these software modules. Other SVT software modules (not shown herein) may also be present in the storage device 904.

Upon reading this disclosure, those of skill in the art will appreciate still additional alternative designs for providing and using a virtual testbed for development of test sequences for SVT. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer-implemented method of emulating selected steps of a system verification test of a system under test (abbreviated SUT) coupled by a network to a testing system including a virtual testbed, the method comprising:
providing a test script comprising a plurality of steps, including one or more actions that include one or more commands sent via a network to the SUT during a system verification test;
receiving an instruction that selects at least one step from the plurality of steps to return an emulated response from the virtual testbed instead of the SUT;
associating the selected step with an emulated response; and
executing the test script and, responsive to the selected step, returning the associated emulated response without live communication of any command in the selected step to the SUT.

2. The method of claim 1, wherein associating said step of the system verification test with an emulated response includes:
receiving the emulated response to be associated with said step by manual input.

3. The method of claim 2, wherein the emulated response received by manual input includes emulation information corresponding to an expected response from the SUT that is not fully developed.

4. The method of claim 1, wherein associating said step of the system verification test with an emulated response includes:
associating a test result from a previous instance of execution of said step on the SUT as the emulated response for said step of the system verification test.

5. The method of claim 1, wherein all steps of the system verification test are associated with test results from previous instances of execution of the steps on the real system.

6. The method of claim 1, wherein:
a first set of steps of the system verification test are associated with emulated responses;
a second set of steps of the system verification tests are not associated with emulated responses, responsive to said first set of steps being executed, using the associated emulated responses as the responses to actions corresponding to said first set of steps without actually executing said first set of steps on the SUT; and
responsive to said second set of steps being executed, receiving actual responses corresponding to said second set of steps actually executed on the SUT.

7. The method of claim 1, wherein the emulated response is varied for different instances of execution of said step.

8. The method of claim 1, wherein the emulated response includes a fault condition indicative of an error in the SUT that has not actually occurred.

9. The method of claim 1, further comprising:
providing a user interface for receiving said instruction to use emulation with said step and for associating the emulated response with said step.

10. A computer system including a processor and a computer readable storage medium storing computer instructions configured to cause the processor to carry out a method of emulating selected steps of a system verification test of a system under test (abbreviated SUT) coupled by a network to a testing system including a virtual testbed, the method comprising:
providing a test script comprising a plurality of steps, including one or more actions that include one or more commands sent via a network to the SUT during a system verification test;
receiving an instruction that selects at least one step from the plurality of steps to return an emulated response from the virtual testbed instead of from the SUT;
associating the selected step with an emulated response; and
executing the test script using the processor and, responsive to the selected step, returning the associated emulated response without live communication of any command in the selected step to the SUT.

11. The computer system of claim 10, wherein associating said step of the system verification test with an emulated response includes:

receiving the emulated response to be associated with said step by manual input.

12. The computer system of claim 11, wherein the emulated response received by manual input includes emulation information corresponding to an expected response from the SUT that is not fully developed.

13. The computer system of claim 10, wherein associating said step of the system verification test with an emulated response includes:
associating a test result from a previous instance of execution of said step on the real system as the emulated response for the step of the system verification test.

14. The computer system of claim 10, wherein all steps of the system verification test are associated with test results from previous instances of execution of the steps on the SUT.

15. The computer system of claim 10, wherein:
a first set of steps of the system verification test are associated with emulated responses;
a second set of steps of the system verification tests are not associated with emulated responses, responsive to said first set of steps being executed, using the associated emulated responses as the responses to actions corresponding to said first set of steps without actually executing said first set of steps on the SUT; and
responsive to said second set of steps being executed, receiving actual responses corresponding to said second set of steps actually executed on the SUT.

16. The computer system of claim 10, wherein the emulated response is varied for different instances of execution of said step.

17. The computer system of claim 10, wherein the emulated response includes a fault condition indicative of an error in the real system that has not actually occurred.

18. The computer system of claim 10, wherein the method further comprises:
providing a user interface for receiving said instruction to use emulation with said step and for associating the emulated response with said step.

19. A non-transitory computer readable storage medium storing computer instructions configured to cause a processor to carry out a method of emulating selected steps of a system verification test of a system under test (abbreviated SUT) coupled by a network to a testing system including a virtual testbed, the method comprising:
providing a test script comprising a plurality of steps, including one or more actions that include one or more commands sent via a network to the SUT during a system verification test;
receiving an instruction that selects at least one step from the plurality of steps to return an emulated response from the virtual testbed instead of from the SUT;
associating the selected step with an emulated response; and
executing the test script and, responsive to the selected step, returning the associated emulated response without live communication of any command in the selected step to the SUT.

20. The computer readable storage medium of claim 19, wherein associating said step of the system verification test with an emulated response includes:
receiving the emulated response to be associated with said step by manual input.

21. The computer readable storage medium of claim 19, wherein the emulated response received by manual input includes emulation information corresponding to an expected response from the SUT that is not fully developed.

22. The computer readable storage medium of claim 19, wherein associating said step of the system verification test with an emulated response includes:
associating a test result from a previous instance of execution of said step on the real system as the emulated response for the step of the system verification test.

23. The computer readable storage medium of claim 19, wherein all steps of the system verification test are associated with test results from previous instances of execution of the steps on the SUT.

24. The computer readable storage medium of claim 19, wherein:
a first set of steps of the system verification test are associated with emulated responses;
a second set of steps of the system verification tests are not associated with emulated responses, responsive to said first set of steps being executed, using the associated emulated responses as the responses to actions corresponding to said first set of steps without actually executing said first set of steps on the SUT; and
responsive to said second set of steps being executed, receiving actual responses corresponding to said second set of steps actually executed on the SUT.

25. The computer readable storage medium of claim 19, wherein the emulated response is varied for different instances of execution of said step.

26. The computer readable storage medium of claim 19, wherein the emulated response includes a fault condition indicative of an error in the SUT that has not actually occurred.

27. The computer readable storage medium of claim 19, wherein the method further comprises:
providing a user interface for receiving said instructions to use emulation with said step and for associating the emulated response with said step.

* * * * *